United States Patent
Dibb et al.

(10) Patent No.: US 9,910,791 B1
(45) Date of Patent: Mar. 6, 2018

(54) MANAGING SYSTEM-WIDE ENCRYPTION KEYS FOR DATA STORAGE SYSTEMS

(71) Applicant: EMC Corporation, Hopkinton, MA (US)

(72) Inventors: Thomas N. Dibb, Rutland, MA (US); Naizhong Chiu, Newton, MA (US); Gregory W. Lazar, Upton, MA (US); Xuan Tang, Hopkinton, MA (US); Millard C. Taylor, II, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 14/788,778

(22) Filed: Jun. 30, 2015

(51) Int. Cl.
| | |
|---|---|
| *G06F 11/00* | (2006.01) |
| *G06F 12/14* | (2006.01) |
| *G06F 12/0831* | (2016.01) |
| *H04L 9/08* | (2006.01) |
| *G06F 11/20* | (2006.01) |

(52) U.S. Cl.
CPC ...... *G06F 12/1408* (2013.01); *G06F 11/2058* (2013.01); *G06F 12/0833* (2013.01); *H04L 9/0825* (2013.01); *G06F 2212/20* (2013.01); *G06F 2212/604* (2013.01); *G06F 2212/621* (2013.01)

(58) Field of Classification Search
USPC ........................................................ 714/15
See application file for complete search history.

(56) References Cited

U.S. PATENT DOCUMENTS

| | | | | |
|---|---|---|---|---|
| 7,694,191 B1* | 4/2010 | Bono | ................... | G06F 11/004 714/48 |
| 8,266,433 B1* | 9/2012 | Przykucki | ............... | H04L 63/06 380/286 |
| 8,364,985 B1* | 1/2013 | Subramanian | .......... | G06F 21/78 709/223 |
| 2003/0152226 A1* | 8/2003 | Candelore | ................ | H04K 1/00 380/218 |
| 2007/0168284 A1* | 7/2007 | Factor | ................. | G06F 21/6218 705/50 |
| 2008/0052537 A1* | 2/2008 | Nishizono | ............... | G06F 21/78 713/193 |

(Continued)

*Primary Examiner* — Kamini Patel
(74) *Attorney, Agent, or Firm* — Krishnendu Gupta; Jason A. Reyes

(57) ABSTRACT

The techniques presented herein provide for initializing and upgrading data encryption capability in a data storage system. The data storage system in initialized to encrypt data writes using a system wide encryption key. A request is received to upgrade the encryption functionality in the data storage system. A data slice is identified for encryption, wherein the data slice is stored in a RAID group in the data storage system. The data slice is pinned in a first cache memory of a first storage processor and persisted in a second cache memory of a second storage processor. The data slice encrypted and a write operation is initiated to write the encrypted data slice back to the RAID group. If the write operation was successful, the data slice is unpinned the first and second cache memory associated with the data slice is freed, else if the write operation was unsuccessful, the data slice is unpinned and the first and second cache memory associated with the data slice are flushed.

13 Claims, 7 Drawing Sheets

(56) References Cited

U.S. PATENT DOCUMENTS

| | | | |
|---|---|---|---|
| 2009/0092252 A1* | 4/2009 | Noll | H04L 9/083 380/277 |
| 2009/0132760 A1* | 5/2009 | Flynn | G06F 1/183 711/113 |
| 2010/0031062 A1* | 2/2010 | Nishihara | G06F 21/88 713/193 |
| 2010/0080392 A1* | 4/2010 | Feather | H04L 9/083 380/277 |
| 2010/0080393 A1* | 4/2010 | Feather | H04L 9/0827 380/278 |
| 2011/0093699 A1* | 4/2011 | Lovrien | H04L 63/06 713/164 |
| 2011/0150221 A1* | 6/2011 | Kitada | H04L 63/0815 380/255 |
| 2012/0210041 A1* | 8/2012 | Flynn | G06F 1/183 711/3 |
| 2014/0026017 A1* | 1/2014 | Grube | G06F 17/30194 714/770 |
| 2015/0149732 A1* | 5/2015 | Kiperberg | G06F 12/0888 711/139 |
| 2016/0148013 A1* | 5/2016 | Taldo | G06F 21/6218 713/165 |
| 2016/0154698 A1* | 6/2016 | Kazi | G06F 11/1092 714/766 |

\* cited by examiner

MANAGING SYSTEM-WIDE ENCRYPTION KEYS FOR DATA STORAGE SYSTEMS

BACKGROUND

Technical Field

This application relates generally to managing system-wide encryption key(s) in data storage systems.

Description of Related Art

Protecting confidential data (such as medical records, financial records, personal data, social security numbers, credit card numbers, corporate records, intellectual property, etc.) and other sensitive information from theft and/or unauthorized access is becoming increasingly important to businesses, computer users, and government organizations. Confidential data can exist as so-called "data-at-rest", which is data stored on some type of a storage system such as an array or tape), as well as "data in flight," (also referred to as "data in motion" or "data in transit") which includes data as it exists during its transmission or that is temporarily residing in computer memory to be read or updated).

In recent years there have been numerous examples of security breaches involving thefts of both data-at-rest and data in motion from tens of millions of users. Information technology (IT) professionals use various methods to help prevent such data theft. Currently, different techniques are used to protect data in motion as compared with protection of data at rest. For example, secure sockets layers (SSL), virtual private networks (VPNs) and combinations of these are two examples of security technologies that can be fairly effective in protecting and securing data in flight, especially when combined with other methods that protect that data from start to finish, such as message level security and application level security. Data at rest, however, requires different types of protection. Because of data mobility, data storage consolidation, and data replication, a single breach into data at rest can compromise many millions more records than with a single breach of data in flight.

Organizations have many options for securing data-at-rest, including authentication controls, logical separation, physical security, and encryption of information. Although each option has advantages and disadvantages, when extremely large amounts of data are involved, encryption can provide the most workable solution. Encryption of data, as is well known, involves converting data to an unintelligible form called ciphertext, which cannot be read unless a key is used to decrypt the data (in some types of encryption the same key also is used to encrypt the data). Encryption also can be an important way to protect data at rest in other situations, including the electronic and physical movement of data for backup, data recovery, and/or maintenance. In addition, encryption helps to limit exposure to security breaches, so even if someone is able to access the storage media, the data is still protected to prevent unauthorized access to sensitive information on the storage media. Use of encryption also helps address compliance with industry regulations that require encryption, such as the payment card industry Data Security Standard (PCI/DSS), the Sarbanes-Oxley Act, the Gramm-Leach Bliley Act (GLBA), the Health Insurance Portability and Accountability Act (HIPAA), the United Kingdom Data Protection act (UK DPA), the European Union Directive on personal information, (95/46/EC,), various state statutes protecting personal information such as California's CA 1798, and the like.

The security provided by any data encryption technology is as good as the encryption credentials used to encrypt the data. If the encryption key is not securely managed the data is at risk of being compromised. Losing or corrupting the key will lead to disastrous consequences resulting in a data unavailable/data loss scenario. Hence it is vitally important to securely store the keys while making them highly available when needed.

Organizations have sometimes been reluctant to deploy conventional encryption of data at rest for various reasons. Some reasons include the complexity of managing many keys, the need to add extra steps to existing processes for data storage (which can be difficult and time consuming, especially if existing management scripts for replication need to be modified), the expense, the time, and (for some implementations), the need to add one or more appliances to a network. Other issues with deployment of encryption include management complexity (the cost and complexity associated with deploying and managing multiple encryption technologies and key manager); scalability across an enterprise (many "point' solutions for encryption do not scale across application types or infrastructure elements) and disruption to service levels (installing encryption technologies and appliances may require a network outage and/or reconfiguration).

SUMMARY OF THE INVENTION

The techniques presented herein provide for initializing and upgrading data encryption capability in a data storage system. The data storage system in initialized to encrypt data writes using a system wide encryption key. A request is received to upgrade the encryption functionality in the data storage system. A data slice is identified for encryption, wherein the data slice is stored in a RAID group in the data storage system. The data slice is pinned in a first cache memory of a first storage processor and persisted in a second cache memory of a second storage processor. The data slice encrypted and a write operation is initiated to write the encrypted data slice back to the RAID group. If the write operation was successful, the data slice is unpinned the first and second cache memory associated with the data slice is freed, else if the write operation was unsuccessful, the data slice is unpinned and the first and second cache memory associated with the data slice are flushed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Example embodiments described herein present techniques for managing data storage encryption, and in particular, initializing encryption using a system wide encryption key and providing the capability for data in place encryption using cache. The techniques employed in the example embodiments provide for reliably protecting data both before and while encrypting in place data during the encryption process. Data Security has become one of the biggest challenges today particularly of securing the data at rest in the storage infrastructure and protecting against drive loss and theft. Data-at-rest encryption encrypts data stored on the drive using an encryption key.

Figure 1:
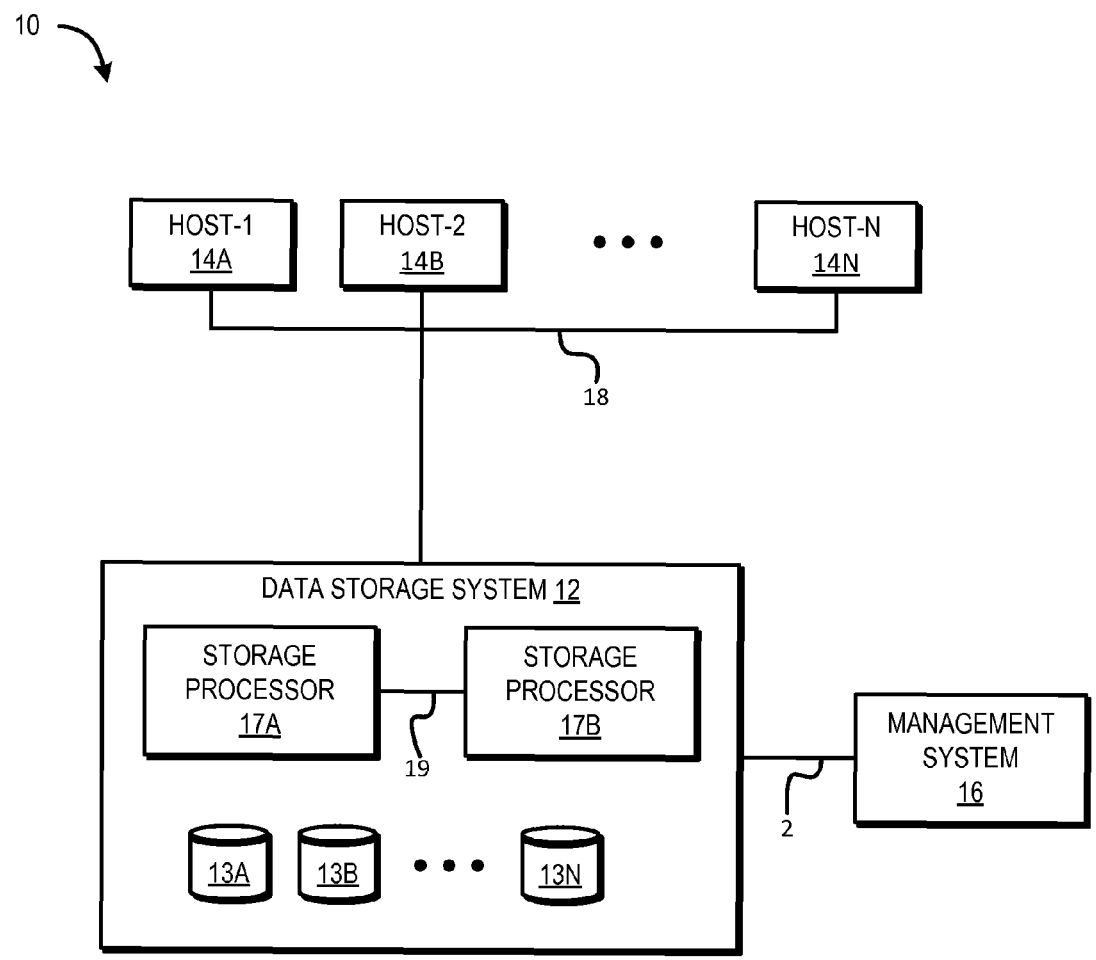
FIG. 1 is an example embodiment of a system that may utilize the techniques described herein.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
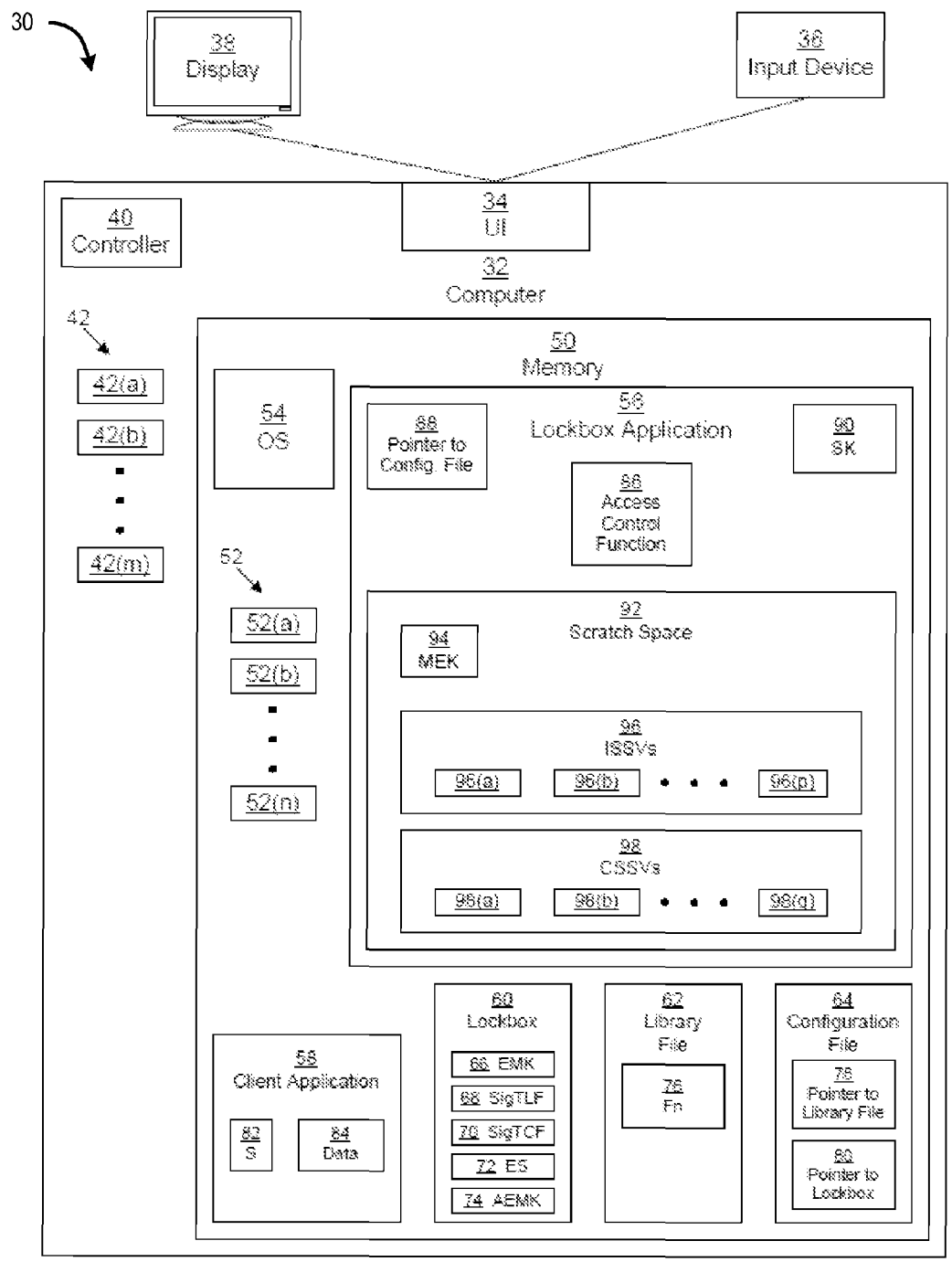
FIG. 2 is a diagram illustrating in more detail components of FIG. 1 that may utilize the techniques described herein.

FIG. 2 depicts a computer system 30 for use in practicing various embodiments. Computer system 30 includes a computer 32 having a user interface (UI) 34 connected to one or more input devices 36 (such as, for example, a mouse, keyboard, tracking pad, trackball, touch-screen, tablet, keypad, etc.) and an output device such as display 38 (such as, for example, a computer monitor or an embedded display screen). Computer 32 further includes a controller 40 (such as, for example, a general-purpose microprocessor, a processor, a central processing unit, dedicated circuitry, etc.), a set of stable hardware values 42 (including stable hardware values 42(a), 42(b), . . . , 42(m)) stored, for example, in read-only-memory (ROM) (such as, for example, a media access control or MAC address of a network adaptor, a disk controller serial number, or an ID number or signature of an installed hardware device, etc.), and memory 50. Memory 50 may include one or more of the following: random access memory (RAM), ROM, system memory, volatile memory, non-volatile memory, static RAM, flash memory, non-volatile data storage, optical storage, electromagnetic storage, floppy disk, hard disk, CD-ROM, DVD-ROM, Bluray, etc. Memory 50 stores, inter alia, a set of stable software values 52 (including stable software values 52(a), 52(b), . . . , 52(n)) (such as, for example, serial numbers of the operating system and various other pieces of installed software, parameters stored by the operating system and various other pieces of installed software, etc.), operating system (OS) 54, lockbox application 56, one or more client applications 58, lockbox file 60, library file 62, and configuration file 64.

Lockbox file 60 is a file that securely stores information on behalf of client applications 58, accessible through lockbox application 56. In some embodiments, lockbox file 60 stores data as a set of name-value pairs, the names representing the meaning of the contents of their respective values. The names may be encrypted for further security. The values are also encrypted, as described in further detail below. Lockbox file 60 may include a few specific encrypted data values: encrypted master encryption key (EMK) 66, signature 68 of a trusted library file 62 (SigTLF), signature 70 of a trusted configuration file 64 (SigTCF), encrypted secret (ES) 72, and Attended-mode encrypted master encryption key (AEMK) 74. In some embodiments, lockbox file 60 may be stored in system memory (or another volatile and temporary storage medium), while in other embodiments, lockbox file 60 may be stored on a hard disk (or another permanent or semi-permanent non-volatile storage medium).

Library file 62 may be, for example, a dynamic-link library (DLL) that stores one or more functions callable by software applications. In particular, library file 62 stores a callback function (Fn) 76, which is operable to return the values of a pre-defined set of stable system values (SSVs) read from the computer 32, drawn from the set of stable hardware values 42 and the set of stable software values 52. This callback function 76 may be provided by the client application 58 to provide application-specific security. In some embodiments, library file 62 may store a plurality of callback functions 76, each one associated with a different client application 58. In other embodiments, multiple library files 62 may exist, each one storing a callback function 76 associated with a different client application 58. As an example, if client application 58 is an encrypted storage application, callback function 76 may be set to return the values of the encrypted storage application's serial number, a primary disk controller serial number, an operating system serial number, and a MAC address of a local network adaptor (the values being delivered in a specific order).

Configuration file 64 is a file which stores various configuration data for the lockbox application 56. In one embodiment, configuration file 64 may be written in a markup language (such as, for example, the eXtensible Markup Language or XML). In particular, configuration file 64 may store a pointer 78 to the library file 62 (pointing either to a memory address or to a file path and name) as well as a pointer 80 to the lockbox file 60 (pointing either to a memory address or to a file path and name). In some embodiments, multiple lockbox files 60 are used, in association with multiple client applications 58, and a mapping between client applications 58 and pointers 80 to respective lockbox files 60 is stored as well. Configuration file 64 may also store function headers for functions stored in various library files 62, such as for callback function 76.

Client application 58 may be any application that can make use of securely stored data through lockbox application 56. For example, client application 58 may be an encrypted storage application. As an additional example, client application 58 may be a web browser that is configured to persistently and securely store user passwords for a variety of websites. Client application 58 manages a secret (S) 82. In one embodiment, secret 82 may be an application-specific encryption key for encrypting application-specific data 84 (for example, application-specific data 84 may be the contents of a storage device, or it may be user passwords for websites). In another embodiment, secret 82 may be the application-specific data 84 itself, the client application 58 relying on the lockbox 60 to securely store the application-specific data 84 rather than merely using the lockbox 60 to store the client-specific encryption key with which the client-application 58 encrypts the application-specific data 84.

Lockbox application 56 includes an access control function 86, a pointer 88 to configuration file 64 (pointing either to a memory address or to a file path and name), a secret key (SK) 90, and scratch space 92. Scratch space 92 may be used to temporarily store various values, such as a master encryption key (MEK) 94 for encrypting secret 82, an initial set of SSVs (ISSVs) 96 (including ISSVs 96(a), 96(b), . . . , 96(p)), and a current set of SSVs (CSSVs) 98 (including CSSVs 98(a), 98(b), . . . , 98(q)), not necessarily at the same time.

Figure 3:
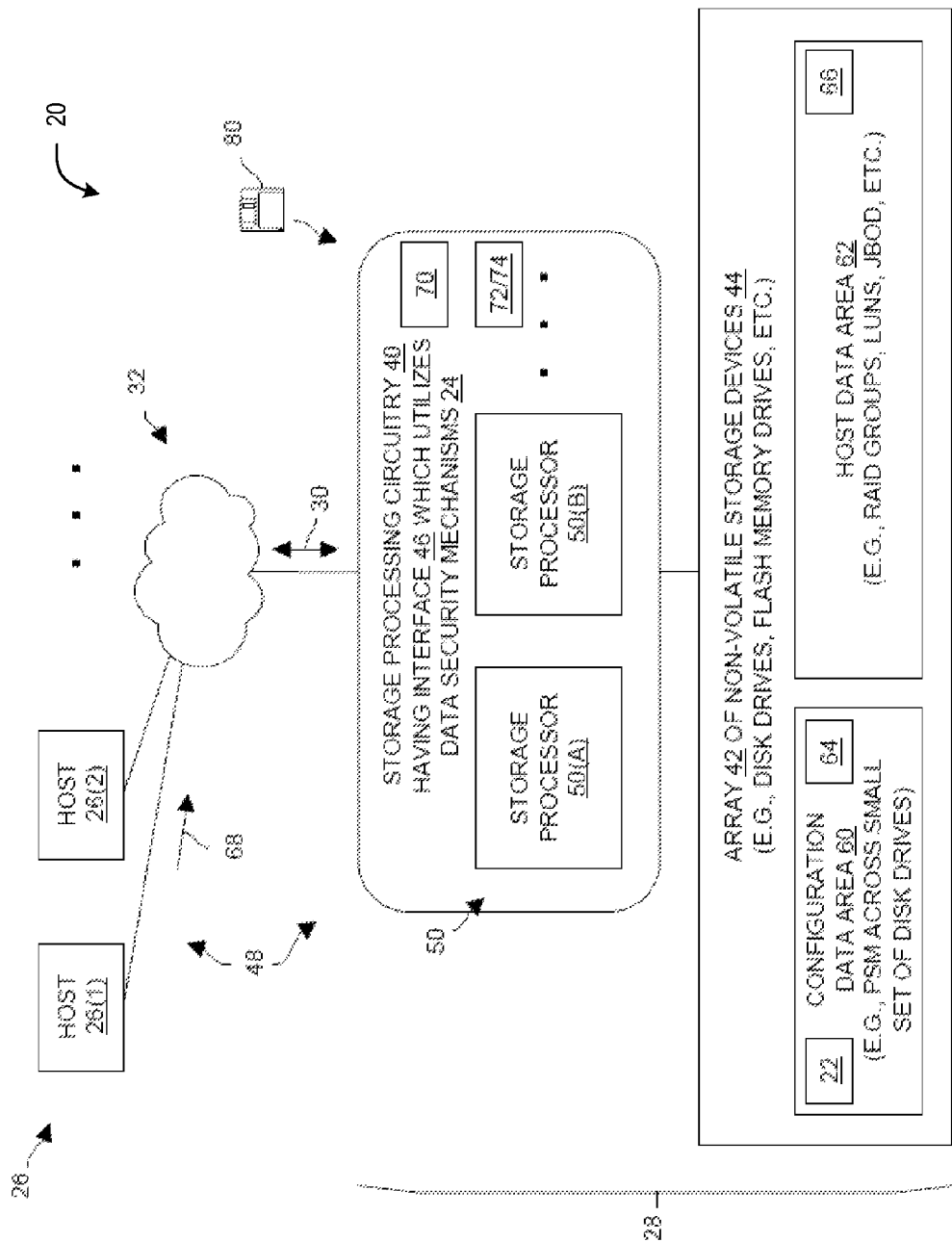
FIG. 3 is a diagram illustrating in more detail components of FIG. 1 that may utilize the techniques described herein.

In operation, computer system 30 may be initialized and configured to securely store secret 82 in lockbox file 60 (see method 100 in FIG. 2) as well as to securely access secret 82 (see method 200 in FIG. 3). Preliminarily, it should be noted that anytime a piece of software, such as lockbox application 56, is mentioned as performing an action, in fact, controller 40 actually performs the action while running the software.

In general, as part of an initialization process, lockbox application 56 (A) calculates and stores a signature 68 of a trusted library file 62 containing a trusted function 76 usable to generate stable system values (SSVs) of the computer, and (B) calculates and stores a first value based on an initial set of SSVs 96 generated by the trusted function 76, the first value and a second value to be used by an access control function 86 to enable access to a stored secret 82. For example, the first value may be EMK 66 and the second value may be the unencrypted MEK 94. In other embodiments, the first value may be any value generated from the initial set of SSVs 96.

As part of a use process, computer lockbox application 56 (A) calculates a signature SigLF of a loaded library file 62 containing an untrusted function 76 used to generate a current set of SSVs 98 upon which the second value is to be calculated, (B) compares the respective signatures of the trusted library file SigTLF 68 and the loaded library file SigLF to generate a comparison result signal, and (C) only when the comparison result signal indicates a successful comparison, permit an access-granting output of the access control function 86 to enable the access to the stored secret. For example, by properly regenerating MEK 94 and allowing it to be used to decrypt ES 72 or encrypt S 82. In embodiments in which the first value is any value generated from the initial set of SSVs 96, the second value may be another value generated from the current set of SSVs 98 such that if the current set of SSVs 98 and the initial set of SSVs 96 are the same (or sufficiently close), lockbox application 56 is able to determine that the lockbox 60 may be opened.

FIG. 3 depicts a data storage system 20 which provides secure access to credentials 22 using data security mechanisms 24. The data storage system 20 includes a set of hosts 26(1), 26(2), . . . (collectively, hosts 26) and a data storage assembly 28. The hosts 26 communicate with the data storage assembly 28 by exchanging electronic signals 30 (e.g., fiber optic signals, electrical signals, wireless signals, combinations thereof, etc.) over a communications medium 32 (e.g., a storage fabric, a computerized network, combinations thereof, etc.) with connects the hosts 26 and the data storage assembly 28 together.

The data storage assembly 28 includes storage processing circuitry 40 and an array 42 of non-volatile storage devices 44. The storage processing circuitry 40 is constructed and arranged to provide an interface 46 which creates and utilizes the data security mechanisms 24 to secure and protect the credentials 22 on behalf of various applications 48 running within the system 20. In some arrangements, the storage processing circuitry 40 includes multiple storage processors 50(A), 50(B), . . . (collectively, storage processors 50). Each storage processor 50 is capable of being replaced during the lifetime of the data storage system 20.

The interface 46 initially creates and configures the data security mechanisms 24 to provide secure storage for the applications 48. This activity will be described in further detail shortly. Although an application 48 will typically access a respective data security mechanism 24, it is possible for multiple applications 48 to share access to a single data security mechanism 24. The applications 48 may run in the hosts 26, in the user space of the storage processors 50, or in both.

As further shown in FIG. 3, the array 42 of non-volatile storage devices 44 provides a configuration data area 60 and a host data area 62. The storage processing circuitry 40 writes system configuration data 64 into and reads system configuration data 64 from the configuration data area 60 when carrying out certain operations such as when making changes to the data storage system 20 and when reporting certain status to a user application. The configuration data 64 preferably includes, among other things, configuration information required for proper operation of the data storage system 20 (e.g., hostnames, LUN or volume information, username and password information, virtual machine configuration information, and so on). An example of the configuration data area 60 is storage allocated for a persistent storage manager module (PSM) of the data storage system 20.

Additionally, during array operation, the storage processing circuitry 40 writes host data 66 into and reads host data 66 from the host data area 62 on behalf of the hosts 26. Such operations occur in response to data storage requests 68 from the hosts 26.

It should be understood that both the configuration data area 60 and the host data area 62 are allocated storage areas which are preferably formed by multiple storage devices 44 (e.g., disk drives, flash memory drives, etc.) running a fault tolerant protocol. Along these lines, the storage devices 44 can be organized as just a bunch of disks (JBOD), volumes, LUNs, RAID groups (e.g., RAID 0, RAID 1, RAID 5, etc.), and so on which are capable of protecting data against various types of failures. For example, in some arrangements, the configuration data area 60 redundantly resides on a small set of disk drives (e.g., four disk drives running a RAID protocol) which are designated for holding PSM data. Similarly, other storage devices 44 can be grouped and arranged to effectively and efficiently hold the host data area 62. Each storage device 44 of the array 42 is capable of being replaced (e.g., hot swapped) during the lifetime of the data storage system 20.

As mentioned earlier, the interface 46 creates a data security mechanism 24 and then stores credentials 22 of an application 48 securely within the data security mechanism 24 on behalf of the application 48. To store the credentials 22 within the data security mechanism 24 and subsequently retrieve the credentials 22 from the data security mechanism 24, the interface 46 provides a set of standard library of routines, function calls, procedures, etc. which can be invoked by the application 48. In some implementations, the interface 46 provides an application programming interface (API) and the application 48 stores a credential 22 by passing it to the interface 46 which then, in combination with the data security mechanism 24, handles encryption/decryption, guarding of encryption keys, and direction of credential storage to the configuration data area 60 of the array 42 in a manner that is transparent to the application 48.

To initially create and configure the data security mechanism 24 to provide secure storage for an application 48, the interface 46 obtains a unique identifier 70 and a set of stable values 72. In some arrangements, the unique identifier 70 is a hostname of the particular host 26 running the application 48 when the hostname is unique to the data storage system 20. The hostname is obtainable from the configuration data area 60 which stores the configuration data of the data storage system 20. In some arrangements, the set of stable values 72 are machine-generated codes from a code generator 74 which are random to users of the system 20.

The set of stable values 72 is preferably generated by a code generator 74 of the storage processing circuitry 40 (e.g., a separate application/module running on the storage processing circuitry 40). In some arrangements, each stable value 72 is randomly generated and has a minimum length of 8 characters (64 bits) and a maximum length of 255 characters (2040 bits). In some arrangements, each stable value 72 contains at least one lower case character, one upper case character, one digit and one special character for added security.

Once the interface 46 receives the unique identifier 70 and the set of stable values 72, the interface 46 creates the data security mechanism 24 and configures the data security mechanism 24 to allow access to secure storage using a system fingerprint. The system fingerprint is based on both the unique identifier 70 and the set of stable values 72, e.g., a combination of the unique identifier 70 and the set of stable values 72.

It should be understood that the operations of (i) obtaining the unique identifier 70 and the set of stable values 72, (ii) creating the data security mechanism 24, and (iii) configuring the data security mechanism 24 to use the system fingerprint, are preferably performed in a manner which is transparent to the application 48. In particular, the interface 46 is able to acquire, as the unique identifier 70, the hostname of the host 26 running the application 48 from the configuration data stored in the configuration data area 30. Additionally, the interface 46 is able to acquire and save, as the set of stable values 72, machine-generated codes. The interface 46 is able to carry out these activities independently without assistance from the application 48.

Once the data security mechanism 24 is created and configured, the interface 46 is capable of receiving the credentials 22 from the application 48 and storing the credentials 22 in encrypted form as a set of files within the configuration data area 60 of the array 42. Accordingly, the credentials 22 enjoy the same safeguarding as other configuration data 64 of the system 20.

When the application 48 requires subsequent access to the credentials 22 (e.g., during a user login operation), the interface 46 obtains the unique identifier 70 and the set of stable values 72 in real time, and delivers this information to the data security mechanism 24. The data security mechanism 24 dynamically generates a current fingerprint and compares the current fingerprint to the earlier-created system fingerprint. Only if the current fingerprint matches the system fingerprint does the data security mechanism 24 decrypt the credentials 22 and provide the decrypted credentials 22 to the application 48 through the interface 46.

The interface 46 initially creates and configures a data security mechanism 24 for an application 48 and then operates as a conduit which enables that application 48 to subsequently access the credentials 22 stored within the data security mechanism 24 (e.g., the interface 46 provides wrapper and callback functions to the data security mechanism 24). To this end, the data security mechanism 24 includes an executable portion which runs within the storage processing circuitry 40 and a storage portion which resides within the configuration data area 60 (e.g., within the PSM). Once the data security mechanism 24 is created, the data security mechanism 24 uses keys for encryption and decryption. These keys are unique and random from a user's perspective and are automatically managed by the data security mechanism 24. It should be understood that the data security mechanism 24 may employ certain features from standard lockbox modules/files such as cryptographic keys, passwords, and configuration data as described elsewhere herein.

In some arrangements, the data security mechanism 24 further includes in-memory storage within the storage processing circuitry 40 (i.e., local semiconductor memory). In these arrangements, the credentials 22 always remain in encrypted form while the credentials 22 of the application 48 reside in the configuration data area 60. The credentials 22 are decrypted only after a copy of the credentials 22 is moved into the in-memory storage within the storage processing circuitry 40. Such operation by the interface 46 enables the reduction of frequent input/output (I/O) operations to the configuration data area 60 (i.e., a large number of reads of the configuration data area 60 in a short period of time) since access can be restricted at least temporarily to the local, in-memory copy of the credentials 22.

An example of an application 48 which benefits from the secure handling of credentials 22 in the manner described above is a service role tool application which provides a set of service accounts requiring user logins which use usernames and passwords. Another example of such an application 48 is a graphical user interface (GUI) (i.e., a system management application) which displays particular views of virtual machine information of the data storage system 20 such as information regarding ESX servers offered by VMWare of Palo Alto, Calif. Other application examples include upgrade routines and procedures, new storage processor routines, and the like. For such applications 48, the interface 46 directs the data security mechanisms 24 to maintain their credentials 22 (e.g., usernames and passwords, virtual machine configuration information) in encrypted form within the configuration data area 60 of the array 42. As a result, the applications 60 are able to store their credentials 22 securely within the data security mechanisms 24 through the interface 46.

It should be understood that the set of stable values 72 is preferably stored in a secure and safe manner outside the data security mechanism 24. In some arrangements, the interface 46 stores the set of stable values 72 on behalf of the application 48 as configuration data 64 in the configuration data area 60 of the array 42 but separately from the data security mechanism 24. As a result, any part of the data storage system 20 can be lost and replaced with the exception of the configuration data area 60, and the application 48 will be able to maintain access to the credentials 22. For example, the hardware of the host 26 can be replaced with new hardware which is given the same hostname. As another example, the storage processing circuitry 40 can be replaced with new storage processing circuitry 40. Moreover, any of the storage devices 44 can be replaced (even one or more disks forming the configuration data area 60) as long as coherency of the configuration data area 60 is preserved. In all of these situations, the interface 46 is capable of dynamically generating a current fingerprint from the unique identifier 70 and the set of stable value 72, and then gaining access to the credentials 22 which are securely stored in the configuration data area 60.

It should be further understood that the interface 46 is capable of being delivered to and installed in the storage processing circuitry 40 from a computer program product 80 (illustrated generally by a diskette icon 80). Such a computer program product 80 includes a computer readable storage medium which stores instructions that are executed by the storage processing circuitry 40. Examples of suitable computer readable storage media include CD-ROM, flash memory, disk memory, tape memory, and so on.

However, the data Security provided by encryption is only as good as the generation, protection and management of the authentication key used to encrypt the DEK. The AK must be available when needed but at the same time access to the keys must be tightly controlled. The life cycle of the AK must be managed as the key is must be preserved for the life time of the data. Loss or corruption of the AK will lead to a DU/DL.

In order to protect and securely manage the lifecycle of the key encryption key the Data-at-Rest Encryption feature incorporates an Embedded Key Manager (EKM). The Key Manager is responsible for generation, secure storage, retrieval, backup and restore of the authentication key. The key lifecycle is self-managed and is not exposed to the user. The only user action permitted on the key is to backup it up and restore if needed. The encryption credentials are stored securely in an encrypted store in a triple mirrored partition and needs known values associated with the hardware at the time of the key creation to access the key. The key manager uses a mini-RAID engine to verify, rebuild and maintain consistency of the three copies. The key manager also handles drive errors and drive insertion or removal scenarios to rebuild the key on those drives. In addition to the triple mirror the key manager also stores the key on the SSDs residing on the two SPs. The key copies are sync'ed during every transition of the key state.

Figure 4:
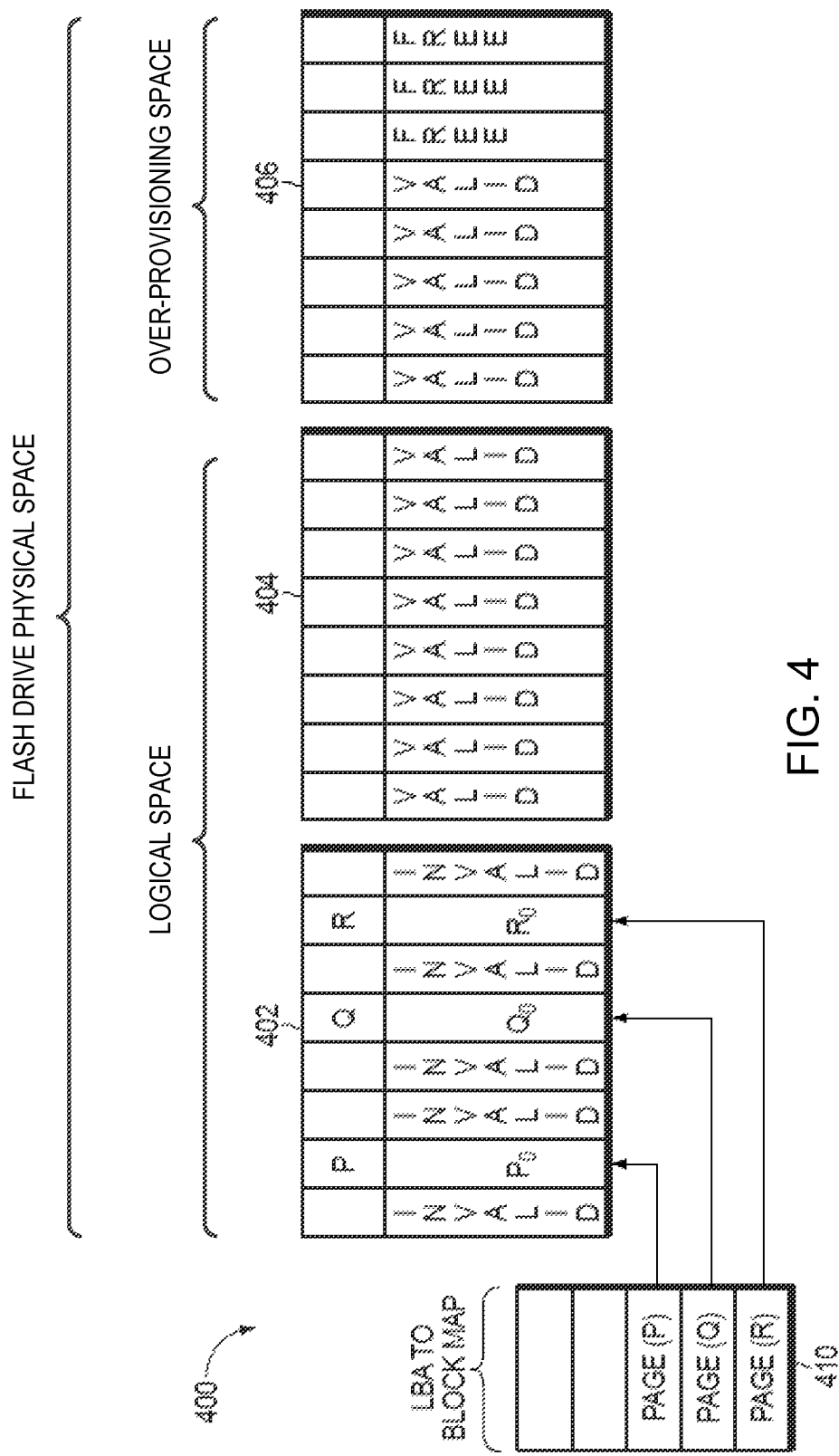
FIG. 4 is a diagram illustrating logical and over-provisioning space for a flash drive.

FIG. 4 depicts a solid state drive (SSD) 400 such as a NAND based flash device having a physical size organized into blocks (402, 404, 406) for storing data. The blocks may be further subdivided and allocated as logical space blocks 402, 404 and over-provisioning space blocks 406. There is also illustrated a translation layer represented by a map 410 which can be referenced such that data content can be located at a specific location in the blocks (402, 404, 406). It should be understood from the FIG. that data content $P_0$, $Q_0$ and $R_0$ is located at pages P, Q, and R, respectfully, in the first block 402. However, there is also invalid data at locations in the first block 402 which have no pointer thereto. In other words, the locations comprise data that is not erased but not used either. It should be understood that the second block 404 comprises valid data with pointers (not shown) from the map to the specific locations. The pointers have been omitted for ease of illustration in this FIG. It should also be understood that the third block 406 comprises blocks allocated for over-provisioning space and may be used for wear levelling, garbage collection tasks and other housekeeping tasks as described herein.

A flash cache or flash tier may be implemented using one or more SSDs within a data storage system according to techniques described herein. Flash memory is commonly referred to as 'write-once' technology because data cannot be written over directly. Rather, new data writes need to be written to a different page. The old data is marked invalid and indicated as erasable. As the flash cache is exercised, a block may become fragmented in that it may contain multiple valid and invalid pages. A block erase it is necessary to recoup the space previously consumed by pages that have been invalidated. However a block may also include valid pages, thus, it is necessary to copy any valid pages to a different block before erasing the block. The process of copying valid data to a new block prior to block erasure may be referred to as garbage collection.

For example, to recoup invalid pages in block 402, it is necessary to erase the pages first. However, it is not possible to overwrite or erase an individual page P0, Q0, and R0. Rather, it is necessary to erase an entire block before new data can be written to the block. Thus, if data is to be written from another location to one or more pages in the first block 402, it will be necessary to erase the entire block 402 as it will not be possible to overwrite data in the pages of the first block 402 of the flash device. To enable the new data to be written to the block 402, the valid data P0, Q0 and R0 in the first block 402 is written to free locations in the over-provisioning block 406. Furthermore, the map will be updated such that the pointers point to the new locations in the third block 406 (not shown). This enables the data in the first block 402 to be invalidated and the entire block 402 will be erased after which new data can be written to the newly freed pages in the block 402.

A data storage system implementing flash device storage technology may have multiple layers controlling various data management functions within the storage system. For example, there may be an SSD layer configured to manage data storage related operations associated with the SSD and a cache layer configured to manage data storage related operations associated with storage system cache.

The SSD layer is responsible for maintaining a map of LBAs for data that is stored in the SSD's flash. Pages are used to represent ranges of LBA's, and as noted herein, groups of pages may also be referred to as blocks. The states of these pages include: erased/free, valid, and invalid. The erased/free state represents pages that have been cleared and are available to be written to. The valid state represents a page that has been written to and contains the latest data for the associated LBA range. The invalid state indicates that a page was written to, but a more recent write of data to the same LBA range has occurred and has been placed in another page. Consequently, this page no longer represents information that will be retrieved by a user. A page will remain in this state until the block that contains the page is erased.

The cache layer maintains a map of pages of LBA ranges for data that is stored in the cache. The states of these pages include: invalid/free, valid/clean, and valid/dirty. In the cache layer, there is no different between invalid/free, like there is in the SSD layer. This state represents a page that does not contain any mapped data. The valid/clean state is used to represent a page that is stored in the cache, but there is another copy of this same information in the datastore. The valid/dirty state is used to represent a page that is stored in the cache, but has more recent data than what is in the datastore.

As referenced herein, the lifecycle of a cache page may be described as follows. In an example embodiment, some data D is retrieved from the datastore at a host LBA Y and placed in the cache which, in this example, causes a write of that data to cache LBA X in an SSD. The cache layer will now have an entry in its map that associates host LBA Y to internal Page P. At the cache layer, the map will contain a pointer to SSD LBA X. This entry will be set to Valid/Clean because there is another copy of the same information in the datastore.

The SSD layer will also have a corresponding entry in a table that associates LBA X to a page of flash memory that contains the data P0. This entry will be marked Valid. Now the host writes an update to page P. This will not cause the cache map to change, but will cause the state to change to Valid/Dirty. It also will cause a new write of data to LBA X to the SSD.

At this point, the SSD looks for a free page to write the new data for LBA X. If no free pages are available, a garbage collection cycle (as described herein) will be performed to make the necessary free pages available. Since the data cannot be stored until this step is performed, and the operation must wait for this step to complete, it can affect system operating performance as well as flash lifetime. This process may be referred to herein as a foreground garbage collection cycle. Once the new data is stored, the map is updated to associate LBA X with the new flash location, and the old page location is marked as invalid.

It should be noted that the flash over-provisioning space 406 is used exclusively for underlying flash tasks such as wear leveling and garbage collection as dictated by the flash translation layer. The storage system can only access the logical space 402, 404—the storage system cannot directly access the over-provisioning space 406. It should also be noted that the techniques presented herein discuss flash memory by way of example. However, the techniques should not be construed as being limited thereto and other alternative memory technologies can be similarly implemented including, but not limited to, Ferroelectric RAM (FRAM), MRAM, Phase Change Memory (PCM), Magneto Resistive RAM (MRAM), Nano-RAM (NRAM), memristor, Programmable Metallized Cell (PMC), and the like.

Figure 5:
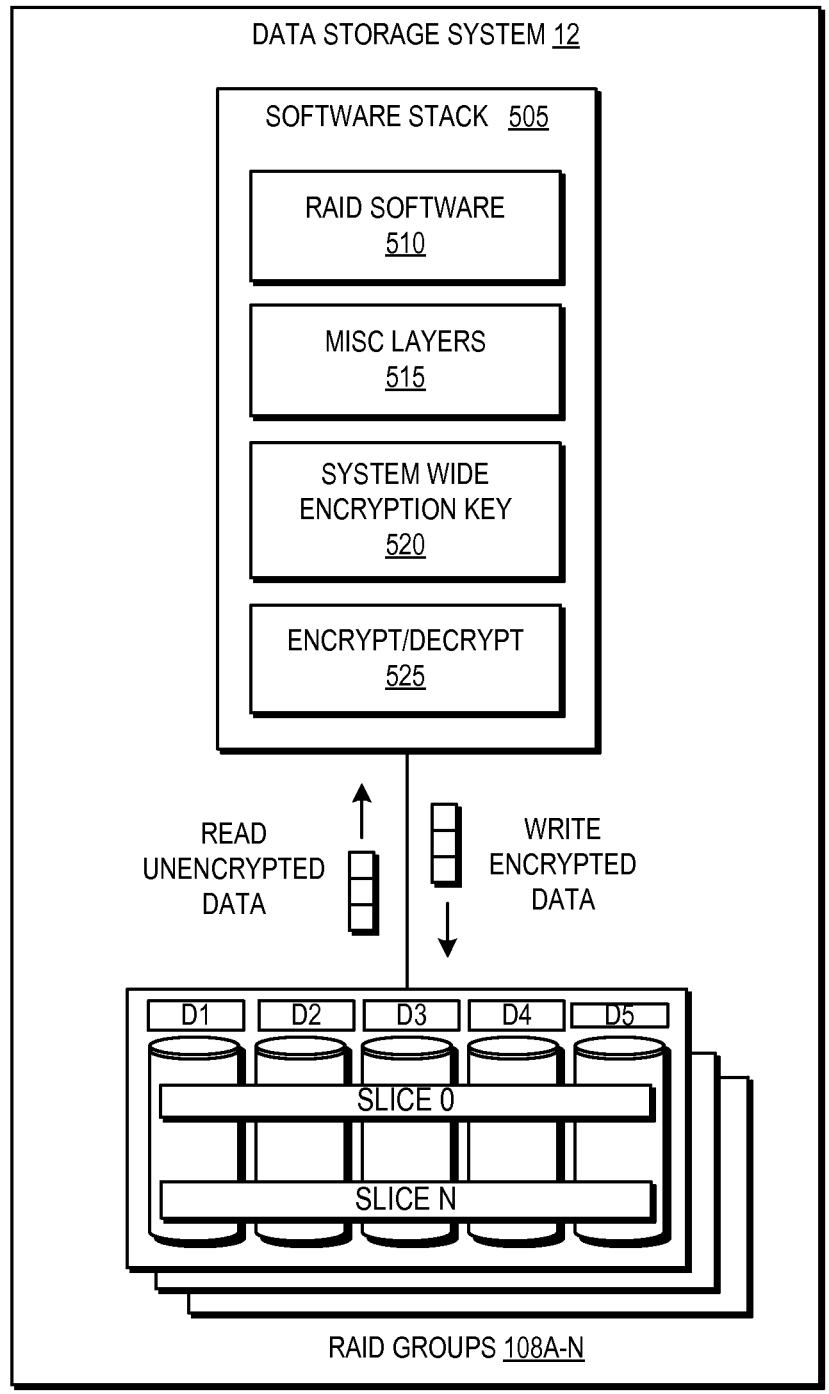
FIG. 5 is a diagram illustrating encryption components employing one or more system wide encryption keys that may utilize the techniques described herein.

FIG. 5 depicts an example embodiment illustrating a data storage system 12 implementing system wide encryption key(s) according the techniques described herein. In this example, encryption functionality is provided by a lower layer driver/module. The data storage system 12 receives read/write requests from, for example, a host application (not shown). By contrast to a complex, high-level, full feature encryption scheme, the current techniques implement a clean, simple encryption scheme directly in the software stack 505 such that all data written to the data storage system is encrypted. The data storage system 12 includes a software stack 505 that includes RAID software, misc. layers (e.g., mirror view, snap view, mapped LUN driver, etc.), one or more system wide encryption keys 520, and an encryption and decryption modules 525. Read and write commands are directed to storage units 108A-N configured in RAID groups that include flash drives and/or hard disk drives.

In this embodiment, the data storage system 12 is designed with the system wide encryption key 520 and encryption/decryption module build in as a base functionality such that any and all data written to the RAID groups 108A-N is encrypted from the moment the data storage is first powered up. Thus, when the data storage system 12 arrives at a customer site, data is continuously and transparently encrypted when written to the RAID groups 108A-N and decrypted when read back.

Figure 6:
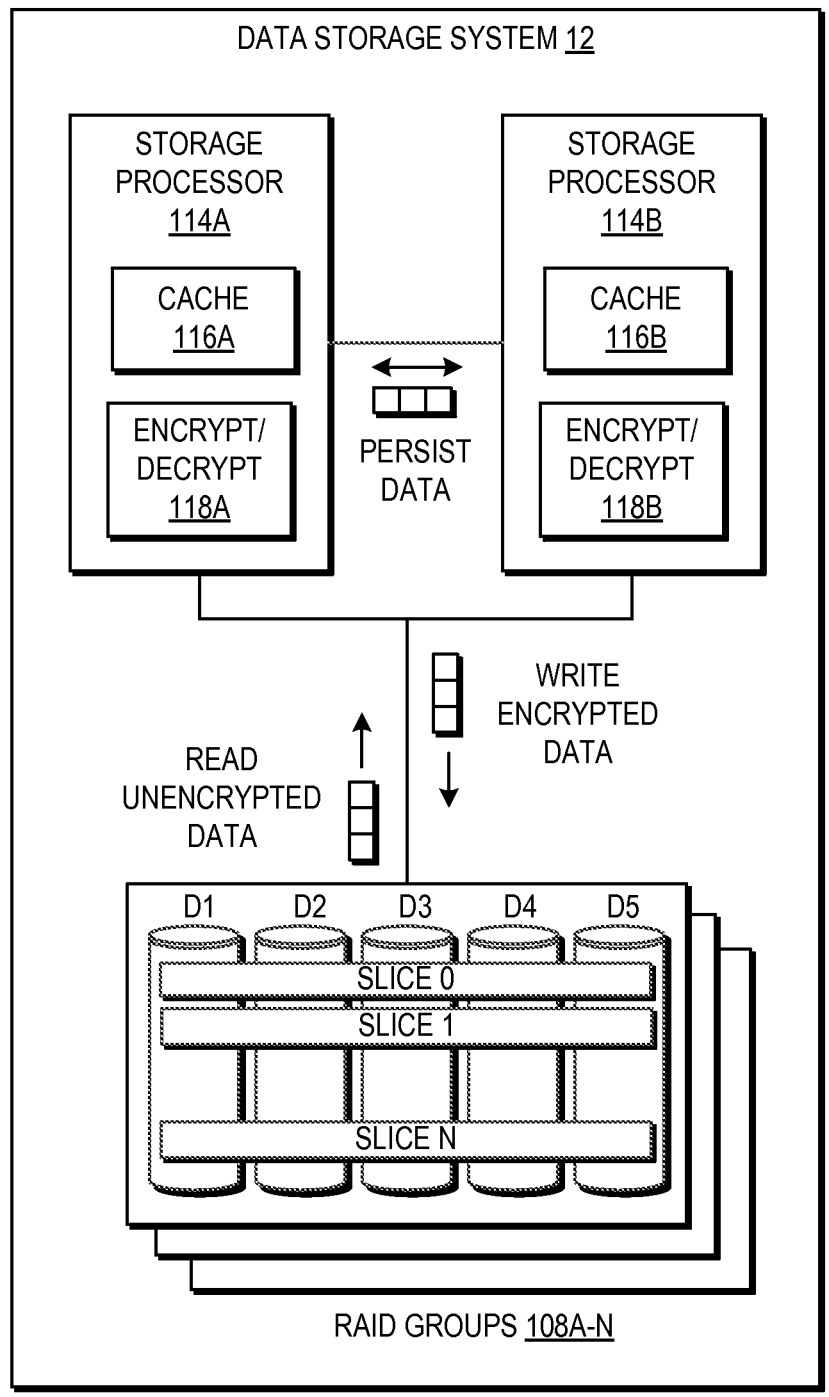
FIG. 6 is a diagram illustrating in more detail components of FIG. 1 implementing data in place encryption that may utilize the techniques described herein.

FIG. 6 illustrates an example embodiment for upgrading the data storage system 12 having the previously described base encryption capability to a full featured encryption system. Employing techniques described herein provide a mechanism to upgrade the system at a customer's site by using data in place encryption scheme. The techniques dramatically decreasing the time to encrypt data in place while ensuring safeguard of the data to prevent data loss. To provide faster encryption of user data, all drives of a disk array may be encrypted in parallel. Using all the drives in parallel provides the performance of all the drives simultaneously; however, this puts all the data at risk because it is all "in flight" during the encryption process. If drives were to fail during the encryption process, there is the possibility of data loss due to incomplete writes. The techniques described herein solve this data integrity issue in part by using cache to protect the data that is being encrypted.

In order to encrypt user data, an unencrypted data slice read from a RAID group, encrypted, and then gets written back to the RAID group using an encryption key. Encrypting user data requires reading and writing all of the data for a given LUN. The current technique provides mechanisms to read the data slice into cache and "pin it." As a result, user data is persisted thereby protecting the data in the event an incomplete write occurs due to, for example, a system failure. Once the data is pinned, the encrypted data is written. Once this write is successful, the data can be safely "unpinned" from cache. The data can then be marked as "clean" because it does not need to be written by cache since the RAID level has already written it.

However, an incomplete write that occurs during the encryption process can result in data loss. Incomplete write may be caused by a variety of failures including, but not limited to, system power failure, enclosure power failure, cable failure or SP failure. In the case of an enclosure losing power while a disk is writing the media, the disk being written to may not update its error correction code (ECC) before the power goes down. This results in the loss of the data on that blocks that were being written to since the block is no longer readable. If multiple drives experience this situation at the same time during the encryption process, then data loss is possible since redundancy is lost in the stripe due to errors in the stripe.

Example embodiments may include a data storage system 12 having two or more storage processors 605A, 605B, directly or indirectly, communicatively coupled to each other and to multiple RAID groups 108A-N in a manner similar as described elsewhere herein. A first storage processor 605A may include a first cache memory 610A and an encryption/decryption module 615A. A second storage processor 605B (also referred to as a "peer" processor) may include a second cache memory 610B and a second encryption/decryption module 615B. The encryption/decryption modules 615A, 615B are hardware modules configured to perform the encryption/decryption operations in hardware as opposed to software methods, and, therefore, are capable of executing the encryption/decryption operations at virtually line speed. Data stored on the RAID groups 108A-N may be stored as slices of data striped across the drives that make up its particular RAID group configuration. In normal operation, data written to a RAID group 108A is encrypted and data read from the RAID group 108A is decrypted.

The data storage system 12 may be a system deployed at a customer site, running in production and may store a significant amount of data. Increasing privacy concerns and regulations, hacker attacks, and physical theft of drives have created a need to further safeguard user data. User data stored in a RAID group may be referred to herein as "data in place" as opposed to data in transmission that is referred to as "data in flight." Data encryption can provide an effective means to prevent unauthorized access to such data; however, existing systems often lack the capability to encrypt data in place in an acceptable time frame and performance level. The techniques described herein are particularly well suited for encrypting data-in-place stored on an existing storage system.

Encrypting user data requires reading all the data on all drives, encrypting it, and writing the encrypted data back to the drives. Conventional methods for modifying data on a drive (e.g., RAID drive rebuild) read data from one drive at a time, block by block. It may take weeks to rebuild the data on a single drive. Such an extended time may be acceptable for rebuilding a single drive; however, these methods cannot be used to encrypt data in place in a storage system since a storage system may have tens or hundreds of drives and at even a week per drive, this is simply an unacceptable amount of time to complete the encryption process. Furthermore, should a system error occur (e.g., a power failure), conventional methods may result in data loss. By contrast, the current techniques can quickly and safely encrypt all user data on a storage system.

Figure 7:
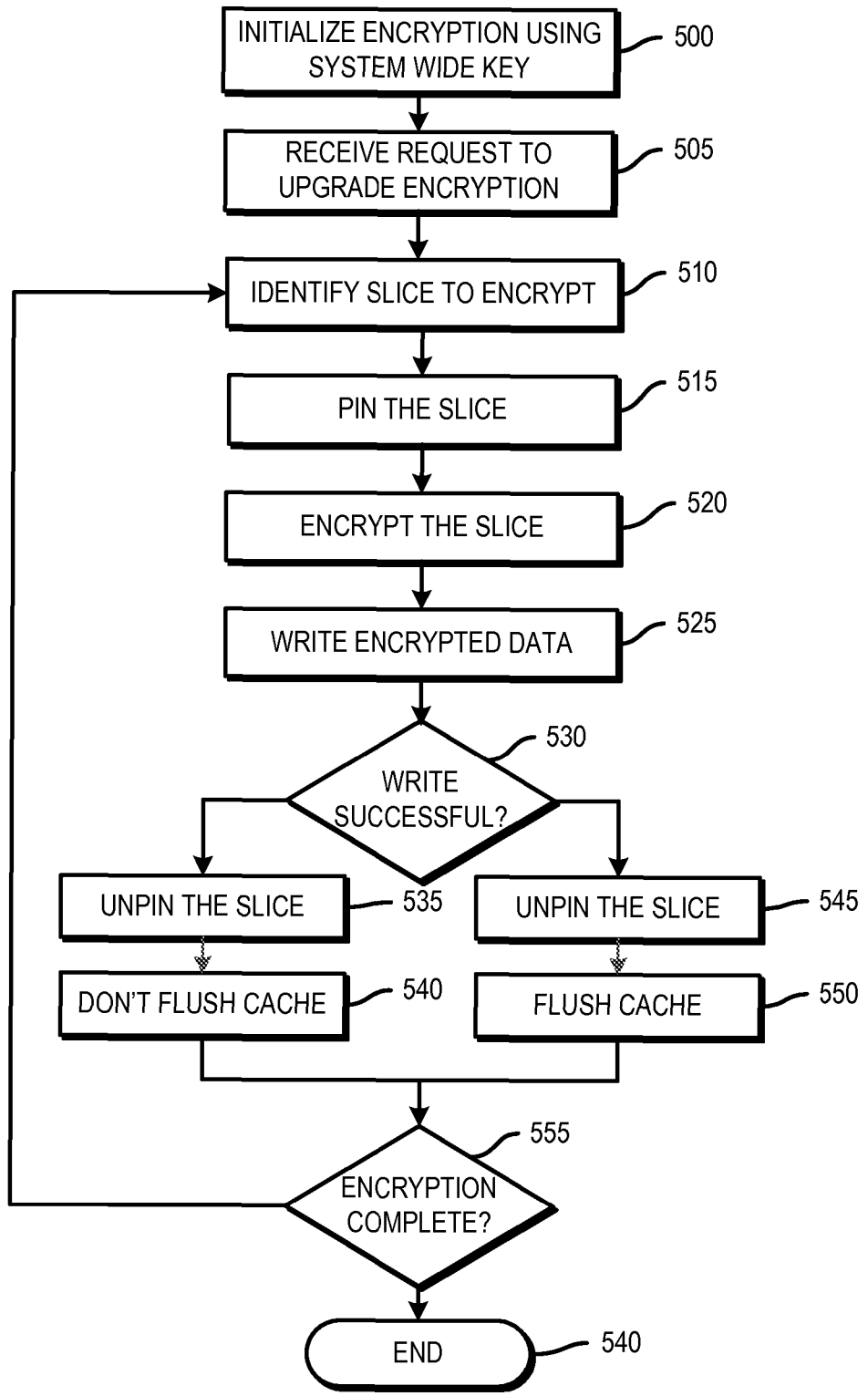
FIG. 7 is a flowchart of a method that may utilize the techniques described herein.

FIG. 7 is a flow diagram that illustrates an example method for use in implementing techniques described herein for managing data storage system encryption. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

Referring to FIGS. 6 and 7, the method can begin at step 500 where the data storage system is initially configured to encrypt data using the system wide encryption key functionality as was described above. At some point in time, a user decides to upgrade the storage system's encryption capability and functionality and initiates an upgrade request. The initial may be initiated manually by a user, for example, by clicking on a button or other object in a graphical user interface (GUI) associated with a management system or by entering a command in a command-line-interface, or as embedded in other software or downloaded using a license key or the like. Execution of the upgrade can also be based on various user-specified parameters.

At step 510, the method may identify a slice to be encrypted. Although examples discussed herein describe data slices stored in RAID groups, these examples are intended as a vehicle for discussion purposes only and such examples should not be construed as a limitation as the techniques may be similarly applied to other storage object types described elsewhere herein. Metadata associated with each slice may include information indicating whether the slice is encrypted or unencrypted. A checkpoint file may be maintained to track this information and scanned to determine if a particular slice has been encrypted or not. Thus, the checkpoint file may be used to help keep track of where the encryption process is as the process proceeds. In the event of a failure, the method can resume at some point in time after the failure has been fixed the continue encrypting where the process left off prior to the failure event.

Once a slice that needs to be encrypted is been found, the slice may be pinned to the first cache 116A in the first storage processor 114A. For example, a call to the cache 116A may be made to pin the LBA range of blocks associated with the slice. The storage processor 114A allocates cache memory necessary to save the data and the cache 116A reads the unencrypted data into the cache 116A and updates the slice's metadata. The data will also be 'persisted' by copying the data to a second cache 116B in a second storage processor 114B. The storage processor confirms completion of the pin operation and marks the data as persisted. Thus, the slice data is mirrored to a peer storage processor for redundancy purposes to provide additional data protection in the event of a system failure. Alternative example embodiments may include determining that the slice to be encrypted exists in write cache, in which case this step may be avoided since the data may already be mirror to the second cache 116B.

At step 520, the method attempts to encrypt the slice using the encryption function of the encryption/decryption module 118A. Because hardware encryption is employed, encrypting and decrypting data can be accomplished very quickly, typically within a couple I/O cycles. Furthermore, because an entire slice is encrypted at once, data across all the RAID group's drives D1-D5 are encrypted in parallel. Thus, if a slice is 1 MB, and the RAID group includes 5 drives, 5 MB's of data are written in a single write instruction.

Once the slice has been encrypted, it is written back to the RAID group 108A at step 525. The write process includes marking the encrypted slice's metadata as "in-progress," writing the data back to the RAID group 108A, and then unmarking in-progress and marking it as encrypted.

At step 530, a determination is made to determine if the encrypted slice was written was successful. If the encrypted data was successfully written to the RAID group, the method proceeds to step 535 where the slice data that was pinned in step 515 is no longer needed and is unpinned by instructing the cache 116A to free the pages associated with the pinned data. In this case, because the write was successful, the cache 116A is not flushed at step 540 as there is no need to. The method proceeds to step 555 to determine if the encryption is complete by checking the checkpoint file, and if not complete, the method may return to step 510 to continue the encryption process by repeating the procedure. Otherwise the method proceeds to step 540 and may end.

However, if, at step 530, the write was not successful, the method proceeds to step 545. Here, the slice data that was pinned in step 515 is no longer needed and is subsequently unpinned. The method then proceeds to step 550 where the storage processor 114A is instructed to flush the cache 118A. The failure causes the drive to not be online, but when the failure is corrected (and/or the system is rebooted) and the drive comes back online, and the unencrypted data stored in cache 116A gets flushed. Thus, from the user data point of view, even though there was a failure, the data is safe because of the marking and pinning mechanisms. If a user executes a read of the slice that was being encrypted at the moment the failure occurred, the data is retrieved from cache, and as a result, the user is unaware and unaffected by the failure.

When the failure condition is resolved, the method can initiate a recovery process to resume the encryption process. For example, the method can resume processing by identifying the slice that was marked in-progress. In this case, the slice extent is invalidated and is written to the RAID group, and the slice is unmarked as in-progress and then marked as encrypted. A cache flush is then executed to restore the previously pinned data to the stripe.

A write may be unsuccessful due to a failure event including, but not limited to, a system power failure, enclosure (i.e., shelf) power failure, cable failure, or storage processor failure. Pinning the data and marking it so as to track the progress of the data through the encryption process advantageously provides a mechanism to recover the encryption process in the event a failure occurs. Such an approach safeguards the data during the failure event. This is particularly important when encrypting a data slice because the data is stripped across several drives comprising the RAID group.

Advantageously, implementing the techniques presented herein provide for initializing a storage system with a base level of encryption using system wide encryption key(s). At a later point in time, the storage system can be upgraded in the field to provide full featured encryption capability, including, for example, providing one or more encryption keys per drive or other storage unit or sub storage unit. The upgrade is performed using the date in place encryption described above. As a result, the data is always in an encrypted state and never readable in plain text format, even in the flash drive over-provisioning mechanism described above. By contrast, with conventional system, encrypting data in the field will not encrypt data storage in the over-provisioning portion of the flash drives.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The techniques described herein may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The block diagrams and flowchart in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for encrypting data in a data storage system, the method comprising:
    initializing the data storage system to encrypt data writes using a system wide encryption key;
    receiving a request to upgrade the encryption functionality in the data storage system;
    identifying a data slice for encryption, wherein the data slice is stored in a RAID group in the data storage system;
    pinning the data slice in a first cache memory of a first storage processor;
    persisting the data slice in a second cache memory of a second storage processor;
    encrypting the data slice;
    initiating a write operation to write the encrypted data slice back to the RAID group;
    unpinning the data slice and freeing the first cache memory and the second cache memory associated with the data slice if the write operation was successful, else unpinning the data slice and flushing the first cache memory and the second cache memory associated with the data slice if the write operation was unsuccessful; and
    initiating a recovery event after recovering from a failure event, the recovery event comprising:
        identifying a data slice marked as in-progress;
        invalidating the data slice across all drives in the RAID group;
        initiating a write operation to write the invalidated data slice back to the RAID group; and
        marking the invalidated data slice as encrypted.

2. The method of claim 1, wherein identifying a data slice for encryption further includes analyzing metadata associated with the data slice to determine if data slice is encrypted or unencrypted.

3. The method of claim 1, wherein pinning the data slice further includes:
    determining the logical block address (LBA) range of blocks corresponding to the data slice;
    allocating cache memory sufficient to range of blocks; and
    reading the range of blocks corresponding to the data slice into the first cache memory.

4. The method of claim 1, wherein persisting the data slice in the second cache memory further includes:
    mirroring the data slice stored in the first cache memory to the second cache memory of the second storage processor; and
    marking the data slice as persisted.

5. The method of claim 1, wherein initiating a write operation further includes:
    marking the data slice as in-process;
    executing the write operation; and
    marking the data slice as encrypted.

6. The method of claim 1, wherein the failure event is a storage system power failure, enclosure power failure, cable failure, or storage processor failure.

7. A system for encrypting data in place in a data storage system, the system comprising storage processors and memory configured to:
    initialize the data storage system to encrypt data writes using a system wide encryption key;
    receive a request to upgrade the encryption functionality in the data storage system;
    identify a data slice for encryption, wherein the data slice is stored in a RAID group in the data storage system;
    pin the data slice in a first cache memory of a first storage processor;
    persist the data slice in a second cache memory of a second storage processor;
    encrypt the data slice;
    initiate a write operation to write the encrypted data slice back to the RAID group;
    unpin the data slice and freeing the first cache memory and the second cache memory associated with the data slice if the write operation was successful, else unpin the data slice and flushing the first cache memory and the second cache memory associated with the data slice if the write operation was unsuccessful; and
    initiating a recovery event after recovering from a failure event, the recovery event comprising:
        identifying a data slice marked as in-progress;
        invalidate the data slice across all drives in the RAID group;
        initiate a write operation to write the invalidated data slice back to the RAID group; and
        mark the invalidated data slice as encrypted.

8. The system of claim 7, wherein identify a data slice for encryption further includes analyzing metadata associated with the data slice to determine if data slice is encrypted or unencrypted.

9. The system of claim 7, wherein pin the data slice further includes:
    determine the logical block address (LBA) range of blocks corresponding to the data slice;
    allocate cache memory sufficient to range of blocks; and
    read the range of blocks corresponding to the data slice into the first cache memory.

10. The system of claim 7, wherein persist the data slice in the second cache memory further includes:
- mirror the data slice stored in the first cache memory to the second cache memory of the second storage processor; and
- mark the data slice as persisted.

11. The system of claim 7, wherein initiate a write operation further includes:
- mark the data slice as in-process;
- execute the write operation; and
- mark the data slice as encrypted.

12. The system of claim 7, wherein the failure event is a storage system power failure, enclosure power failure, cable failure, or storage processor failure.

13. A non-transitory computer readable medium comprising executable code stored thereon for encrypting data in place in a data storage system, the non-transitory computer readable medium comprising executable code for:
- initializing the data storage system to encrypt data writes using a system wide encryption key;
- receiving a request to upgrade the encryption functionality in the data storage system;
- identifying a data slice for encryption, wherein the data slice is stored in a RAID group in the data storage system;
- pinning the data slice in a first cache memory of a first storage processor;
- persisting the data slice in a second cache memory of a second storage processor;
- encrypting the data slice;
- initiating a write operation to write the encrypted data slice back to the RAID group;
- unpinning the data slice and freeing the first cache memory and the second cache memory associated with the data slice if the write operation was successful, else unpinning the data slice and flushing the first cache memory and the second cache memory associated with the data slice if the write operation was unsuccessful; and
- initiating a recovery event after recovering from a failure event, the recovery event comprising:
  - identifying a data slice marked as in-progress;
  - invalidating the data slice across all drives in the RAID group;
  - initiating a write operation to write the invalidated data slice back to the RAID group; and
  - marking the invalidated data slice as encrypted.

* * * * *